Nov. 27, 1962    M. WOOD    3,065,801
SIDEWALK EDGER
Filed Oct. 13, 1960
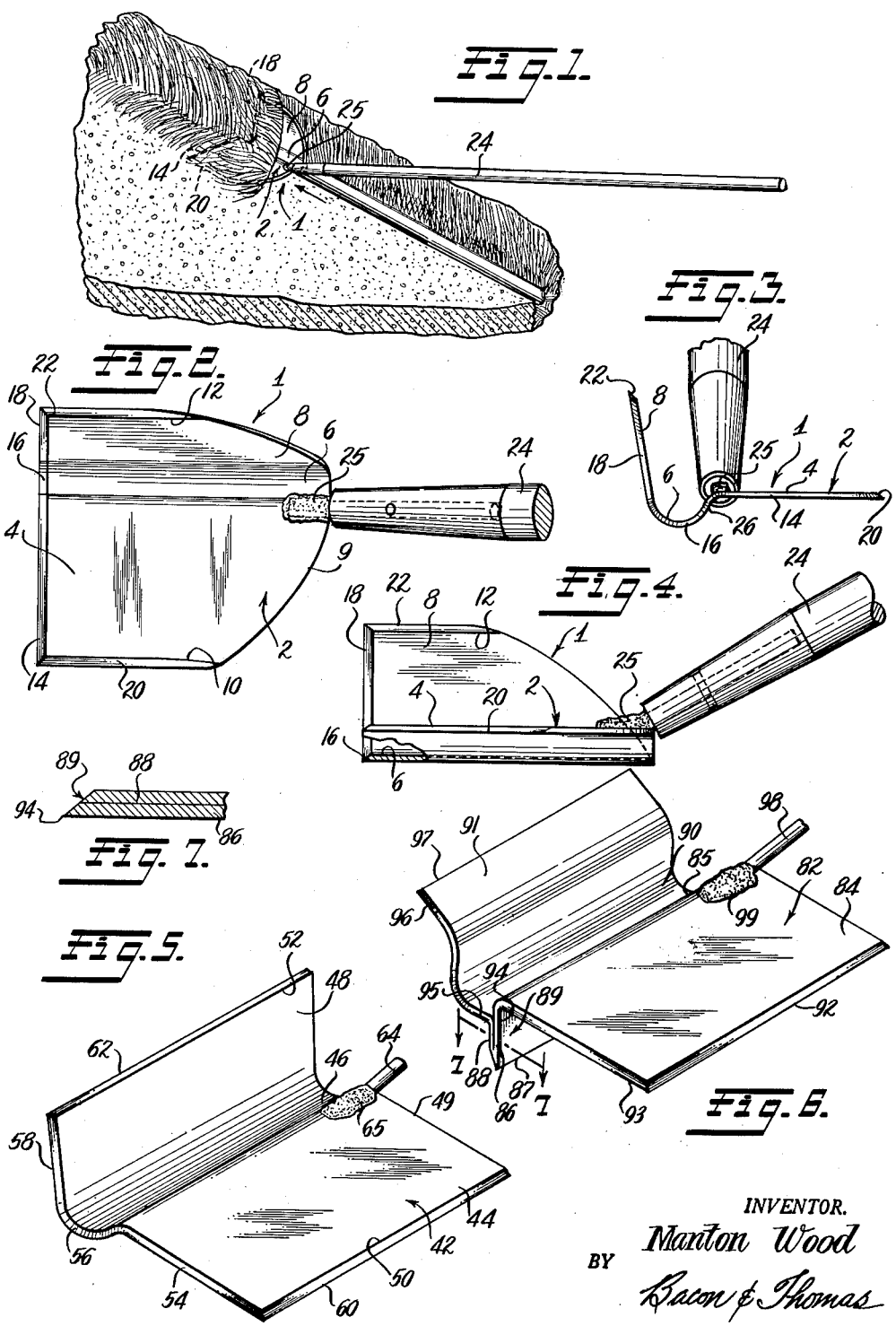
INVENTOR.
Manton Wood
BY
Bacon & Thomas
ATTORNEYS 3,065,801
SIDEWALK EDGER
Manton Wood, Winnfield, La.
Filed Oct. 13, 1960, Ser. No. 62,373
4 Claims. (Cl. 172—13)

This invention relates to lawn edging tools and more particularly to improvements in sidewalk edgers adapted to remove turf when forced along the edge of a sidewalk, curb or driveway.

Grass, which grows along the edge of sidewalks, curbs, driveways and like structures, has a tendency to grow over the upper surface thereof and to take root in the dirt which accumulates on the surface along the edges of these structures. This grass, and that which takes root and grows in the grooves which divide sidewalks into squares, is undesirable as it presents an unsightly appearance and, in addition, makes it difficult to remove dirt and other debris from such a structure by sweeping.

It is, therefore, an object of this invention to provide a sidewalk edger which is adapted to remove undesirable grass and turf by cutting a shallow groove in the turf along the edge of a sidewalk, curb or driveway and at the same time to remove the grass and dirt from the upper surface thereof.

Another object of the invention is to provide a sidewalk edger which is adapted to simultaneously cut a vertical channel and a shallow groove in the turf along the edge of a sidewalk or like structure.

Another object of the invention is to provide a groove forming sidewalk edger which is adapted to gather and remove cut turf when moved in a direction normal to that employed for edging.

Another object is to provide an edger which is adapted to remove the grass and dirt from grooves and cracks in the upper surface of sidewalks and like structures.

Another object is to provide a sidewalk edger which may be formed from a single piece of metal, which is strong, durable and economical to manufacture and which may be easily guided along the edge of a walk or like structure to cut the grass and turf and leave a finished and neat appearance.

These and other objects and advantages of the invention will become more apparent from the following specification when taken in conjunction with the drawings in which:

FIG. 1 is a perspective view of a preferred embodiment of the edger of the present invention;

FIG. 2 is a top plan view of the edger of FIG. 1;

FIG. 3 is a front elevation of the edger as viewed from the left of FIG. 2;

FIG. 4 is a side elevation of the edger of FIG. 1 partly in section, for the purpose of clarity;

FIG. 5 is a perspective view of a modification of the edger of FIG. 1;

FIG. 6 is a perspective view of a further modified form of the edger of FIG. 1; and FIG. 7 is an enlarged, fragmentary, sectional view taken on line 7—7 of FIG. 6.

The sidewalk edger 1, as illustrated in FIGS. 1–4, may be formed with a body 2 from a single piece of heavy gauge sheet metal, although other suitable rigid sheet material which can be formed or molded, such as plastic, may be employed. The body 2 is formed at one side with a flat, horizontal scraper portion 4, at the central portion thereof with a longitudinally extending, horizontally disposed depressed portion 6 and at the other side with an upstanding cutter portion 8. Depressed portion 6, which is substantially U-shaped in cross-section, is disposed below horizontal portion 4 and is of uniform depth and width throughout its length. The upstanding cutter portion 8, which is inclined slightly outwardly from depressed portion 6, extends upwardly to a point substantially above horizontal scraper portion 4.

The back edge 9 of body 2 is formed to curve forward from adjacent depressed portion 6 to the parallel outside edges 10 and 12 thereof. Because of this configuration, the outside edges 10 and 12 of horizontal scraper portion 4 and upstanding cutter portion 8, respectively, are shorter than the greatest length of the edger body 2, which is along depressed portion 6.

A sharp cutting edge is formed across the entire front edge of body portion 2 and includes cutting edge 14 at the forward edge of horizontal scraper portion 4, cutting edge 16 at the forward edge of depressed portion 6 and cutting edge 18 at the forward edge of upstanding cutter portion 8. The outside edge 10 of horizontal scraper portion 4 is formed with a sharp cutting edge 20 and a sharp cutting edge 22 is formed on the upper outside edge 12 of upstanding cutter portion 8.

The edger 1 is provided with a handle 24 which is rigidly attached by a weld 25, or in any other suitable manner, to the back central portion of body 2 and preferably to the upper surface of horizontal scraper portion 4 at the rear thereof and adjacent depressed portion 6.

In use, the edger is placed on the corner of a sidewalk or like structure with the horizontal scraper portion 4 against the upper surface thereof and with the inner wall 26 of depressed portion 6 serving as a guide against the side edge of the structure and pushed forward in the direction indicated by the arrow in FIG. 1. As the edger moves forward, the cutting edge 14 of scraper portion 4 slides along the upper surface of the sidewalk or like structure and cuts the grass and dirt therefrom. At the same time, a shallow groove is cut in the turf along the edge of the sidewalk by the cutting edge 16 of depressed portion 6 while any grass, turf or other obstruction which may be encountered, is severed by cutting edge 18 of upstanding cutter portion 8.

When the edger is turned on one side edge or the other, with either cutter 20 or 22 directed downwardly, turf may be trimmed from around trees, flower beds, etc., by forcing the edger downwardly, that is, in a direction which is normal to that taken for edging along sidewalks and like structures.

In the event that it is desired to remove turf or dirt from the grooves which are formed in the upper surface of a sidewalk or driveway or from cracks which may deve'op therein, depression 6 may be placed lengthwise in the groove or crack and pushed forward to cause cutting edge 16 to cut the turf or dirt therefrom.

Turf and dirt which are cut by the edger, as well as other debris, may be gathered and removed by this same tool. By moving the edger in a sideways direction, with either cutting edge 20 or 22 disposed in a horizontal position in contact with the surface from which the turf and dirt is to be gathered and removed, the material may be gathered by scraping it into small piles and removed by using the edger as a shovel and scooping the debris over side edge 10 or 12 onto the upper surface of the edger.

The edger illustrated in FIG. 5 is similar to the one shown in FIGS. 1–4 in structure and method of operation. Body 42, which may be formed from a single piece of heavy gauge sheet metal, is formed at one side with a rectangular shaped, horizontal scraper portion 44, at the central portion thereof with a longitudinally extending depressed portion 46 and at the other side with a rectangular shaped upstanding cutter portion 48.

In this modification, the back edge 49 of body 42 is parallel with the front edge and the outside parallel edges 50 and 52 extend the entire length of the edger. A sharp cutting edge may be formed across the entire front edge of body 42 with cutting edge 54 at the forward edge of scraper portion 44, cutting edges 56 at the forward edge of depressed portion 46 and cutting edge 58 at the forward edge of cutter portion 48. It is desirable that a sharp cutting edge 60 be formed along the length of side edge 50 and that side edge 52 be formed with a sharp cutting edge 62. A handle 64 may be rigidly attached to the upper surface of scraper portion 44 near the back edge thereof and adjacent depressed portion 46 by a weld 65 or by any other suitable means.

The edger illustrated in FIGS. 6 and 7 may be formed with a body portion 82 from a single piece of heavy sheet metal or other suitable rigid material which may be formed or molded. A flat, horizontally disposed, rectangular shaped, scraper portion 84 is formed at one side of body 82. At the inner edge 85 of scraper portion 84, body 82 is bent downwardly at an angle of approximately 90 degrees to scraper portion 84 to form a depending flange portion 86 and then folded back upon itself along a horizontally extending line 87 to form an upstanding flange portion 88 which extends upwardly approximately one-half to two-thirds of the distance from fold line 87 to scraper portion 84 and thus form a vertical fin 89. At this point, body portion 82 is bent horizontally away from fin 89 for a short distance and then curved upwardly in a reverse S bend, as viewed from the front of the edger, to form a depressed portion 90, positioned below a horizontal plane passing through horizontal scraper 84, and an upstanding cutter portion 91 extending above depressed portion 90. If desired, the flange portions 86 and 88 of body 82, which are in contact with each other to form fin 89, may be secured together by spot welding or in any other suitable manner. In the event that it is desired to form the body portion of the edger from two pieces of rigid sheet material, it would only be necessary to form one piece to include horizontal scraper portion 84 and flange 86 and to form the other piece to include flange 88, depressed portion 90 and upstanding cutter 91 and to secure flanges 86 and 88 together in the same relationship as shown in FIGS. 6 and 7 by welding or in any other suitable manner.

The edger may be formed with sharp cutting edges extending entirely across the front edge thereof and on both side edges including cutting edges 92 and 93 on the side and front edges respectively of horizontal scraper 84, cutting edge 94 on the front edge of fin 89 extending from fold line 87 to scraper portion 84, cutting edge 95 on the front edge of depressed portion 90 and cutting edges 96 and 97 on the front and side edges respectively of cutter portion 91. A handle 98 of any desired length may be rigidly attached to the upper surface of scraper portion 84 near the back edge thereof and adjacent fin 89 by a weld 99 or by any other suitable means.

The edger is used in a manner similar to that described hereinbefore by placing scraper portion 84 on the upper surface of the sidewalk or like structure and with fin 89 serving as a guide against the side edge of the structure. As the edger is pushed forward, cutting edge 93 of horizontal scraper portion 84 will cut the grass and dirt from the surface of the sidewalk, cutting edge 95 of depressed portion 90 will cut a shallow groove in the turf along the edge of the sidewalk, cutting edge 96 of upstanding cutter portion 91 will cut the turf, grass, weeds or other material which may be encountered and cutting edge 94 of fin 89 will cut a narrow, vertical trench, extending downwardly from the groove formed by cutting edge 95, along the side edge of the sidewalk. In order to clean out grooves and cracks in the surface of sidewalks and like structures, fin 89 may be placed lengthwise thereof and the edger pushed in a forward direction to cause cutting edge 94 to cut the dirt and grass therefrom.

While three forms or embodiments of the invention have been shown and described in detail for illustrative purposes, it is to be understood that the invention is not limited thereto as numerous alterations, modifications and substitutions of equivalents will occur to those skilled in the art.

I claim:
1. A sidewalk edger for cutting a shallow groove and vertical trench in the turf along the edge of a sidewalk or like structure and for simultaneously cutting the dirt and grass from the upper surface thereof comprising: a body portion formed at one side thereof with a horizontally disposed, flat scraper portion, said scraper portion having front, rear and side edges; a vertically disposed fin formed lengthwise of said body and extending downwardly from one side edge of said scraper portion, said vertical fin having front and rear edges; a horizontally disposed depressed portion, positioned entirely below said scraper portion and of uniform depth and width throughout the length thereof, extending horizontally outwardly for a short distance from the median portion of said vertical fin in a direction away from said scraper and then curving upwardly to a horizontal plane passing through said scraper portion, said depressed portion having front and rear edges; and a substantially vertically disposed cutter portion extending upwardly and slightly outwardly from said depressed portion at the other side of said body, said cutter portion having a front, a rear and a side edge, said scraper portion being formed with sharp cutting edges on the front and the other side edge thereof, said depressed portion being formed with a sharp cutting edge on the front edge thereof, said vertical cutter portion being formed with a sharp cutting edge on the front edge thereof, and said fin portion being formed with a sharp cutting edge at the front edge thereof.

2. A sidewalk edger for cutting a shallow groove and vertical trench in the turf along the edge of a sidewalk or like structure and for simultaneously cutting the dirt and grass from the upper surface thereof comprising: a body portion formed at one side thereof with a horizontally disposed, flat scraper portion, said scraper portion having front, rear and side edges; a vertically disposed fin formed lengthwise of said body and extending downwardly from one side edge of said scraper portion; a horizontally disposed depressed portion, positioned entirely below said scraper portion, extending horizontally outwardly for a short distance from the side of said fin in a direction away from said scraper and then curving upwardly to a horizontal plane passing through said scraper portion, said depressed portion having front and rear edges; and a substantially vertically disposed cutter portion extending upwardly and slightly outwardly from said depressed portion at the other side of said body, said cutter portion having a front, a rear and a side edge, the juncture of said depressed portion with said fin being intermediate the height of said fin, said scraper portion being formed with sharp cutting edges on the front and the other side edge thereof, said depressed portion being formed with a sharp cutting edge on the front edge thereof, said vertical cutter portion being formed with a sharp cutting edge on the front edge thereof, and said fin portion being formed with a sharp cutting edge at the front edge thereof.

3. A sidewalk edger for cutting a shallow groove and vertical trench in the turf along the edge of a sidewalk or like structure and for simultaneously cutting the dirt and grass from the upper surface thereof comprising: a body portion formed at one side thereof with a horizontally disposed, flat scraper portion, said scraper portion having front, rear and side edges; a vertically disposed fin of equal depth through the length thereof formed lengthwise of said body and extending vertically downwardly from one side edge of said scraper portion, said fin having front and rear edges; a horizontally disposed depressed portion, positioned entirely below said scraper portion, extending horizontally outwardly for a short distance from a point intermediate the height of said fin in a direction away from said scraper and then curving upwardly to a horizontal plane passing through said scraper portion, said depressed portion having front and rear edges; and a substantially vertically disposed cutter portion extending upwardly and slightly outwardly from said depressed portion at the other side of said body, said cutter portion having a front, a rear and a side edge, said scraper portion being formed with a sharp cutting edge on the front and the other side edge thereof, said depressed portion being formed with a sharp cutting edge on the front edge thereof, said vertical cutter portion being formed with a sharp cutting edge on the front edge thereof, and said fin portion being formed with a sharp cutting edge at the front edge thereof.

4. A sidewalk edger for cutting a shallow groove and vertical trench in the turf along the edge of a sidewalk or like structure and for simultaneously cutting the dirt and grass from the upper surface thereof comprising: a body portion formed at one side thereof with a horizontally disposed, flat scraper portion, said scraper portion having front, rear and side edges; a vertically disposed fin formed lengthwise of said body and extending downwardly from one side edge of said scraper portion; a horizontally disposed depressed portion, positioned entirely below said scraper portion, extending horizontally outwardly for a short distance from a point intermediate the height of said fin in a direction away from said scraper and then curving upwardly to a horizontal plane passing through said scraper portion, said fin having front and rear edges; and a substantially vertically disposed cutter portion extending upwardly and slightly outwardly from said depressed portion at the other side of said body, said cutter portion having a front, a rear and a side edge, said scraper portion being formed with a sharp cutting edge on the front edge thereof, said depressed portion being formed with a sharp cutting edge on the front edge thereof, said vertical cutter portion being formed with a sharp cutting edge on the front edge thereof, and said fin portion being formed with a sharp cutting edge at the front edge thereof.

References Cited in the file of this patent
UNITED STATES PATENTS

| | | |
|---|---|---|
| 903,085 | Heather | Nov. 3, 1908 |
| 962,785 | Reichert | June 28, 1910 |
| 1,060,445 | Fields | Apr. 29, 1913 |
| 1,090,267 | Berry | Mar. 17, 1914 |
| 1,154,839 | Bigford | Sept. 28, 1915 |
| 1,699,071 | Kinney | Jan. 15, 1929 |
| 1,891,066 | Smith | Dec. 13, 1932 |